F. H. PARKE.
DOUBLE HEADING DEVICE.
APPLICATION FILED JUNE 5, 1915.
1,219,581.
Patented Mar. 20, 1917.
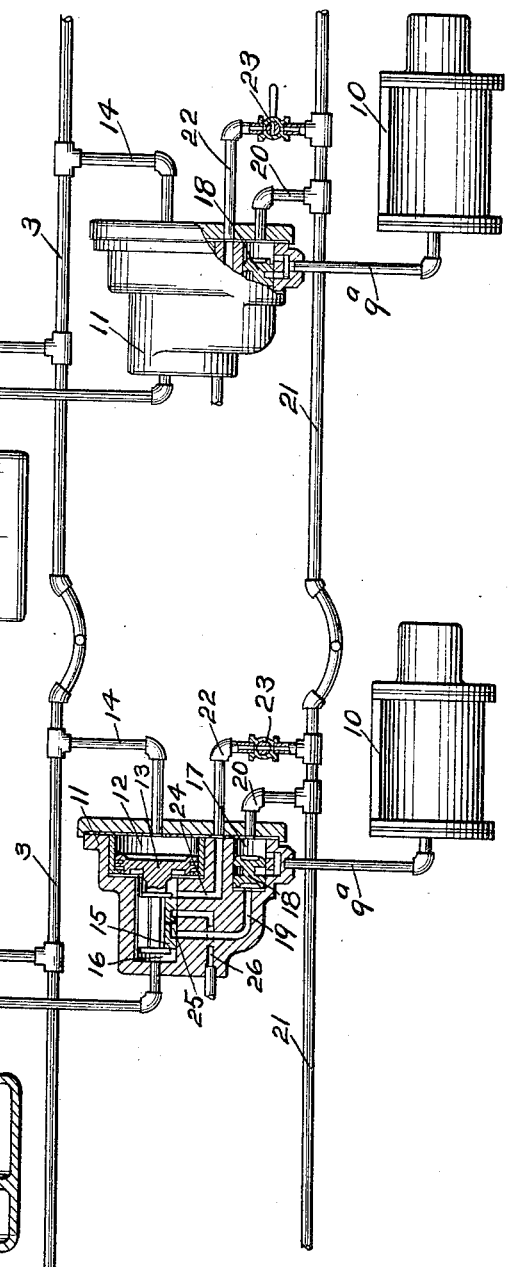
INVENTOR
Frederic H. Parke
by Wm. M. Cady
Att'y.
WITNESSES
H. W. Crowell
G. M. Clements

UNITED STATES PATENT OFFICE.

FREDERIC H. PARKE, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA.

DOUBLE-HEADING DEVICE.

1,219,581. Specification of Letters Patent. Patented Mar. 20, 1917.

Application filed June 5, 1915. Serial No. 32,339.

*To all whom it may concern:*

Be it known that I, FREDERIC H. PARKE, a citizen of the United States, residing at Edgewood, in the county of Allegheny and State of Pennsylvania, have invented new and useful Improvements in Double-Heading Devices, of which the following is a specification.

This invention relates to fluid pressure brakes, and more particularly to a brake apparatus adapted for controlling the brakes in double heading, the present case being in the nature of an improvement on the construction shown in prior Patent No. 1,078,017, dated November 11, 1913.

One feature of the above patent consists in supplying fluid to apply the brakes on both locomotives employed in double heading from one locomotive.

Another feature consists in providing an automatic valve device operated upon a sudden reduction in brake pipe pressure for effecting an application of the brakes.

The communication through which fluid is supplied to effect ordinary service applications of the brakes is controlled by the automatic valve device, said communication being open in release position. In emergency application position, however, the supply passage is connected to an atmospheric exhaust port.

It has been found that occasionally in an emergency application or under a heavy over-reduction in brake pipe pressure, the automatic valve device on the head engine will move to emergency position first. If this happens, the brake cylinder on the second engine will be connected to the atmosphere through the exhaust port of the automatic valve device on the first engine, so that there will result a total loss of braking power on the second engine.

The principal object of my invention is to overcome the above difficulty.

In the accompanying drawing; Figure 1 is a diagrammatic view of a fluid pressure brake equipment for two locomotives coupled together, with my invention applied thereto; Fig. 2 a face view of the slide valve of the automatic valve device; and Fig. 3 a plan view of the valve seat therefor.

As in the patent construction above referred to, a distributing valve device 1 is provided on each locomotive, having the usual branch pipe connection 2 to the brake pipe 3 and comprising a movable abutment 4 subject on one side to brake cylinder pressure and on the opposite side to the pressure in an application chamber 5.

An application valve 6 and a release valve 7 operated by the piston 4 control the admission and release of fluid to and from the brake cylinder. A valve device 8, operated according to variations in brake pipe pressure controls the supply and release of fluid under pressure to and from the application chamber 5.

A brake cylinder supply and release pipe 9 leads from the distributing valve 1 to valve chamber 16 of an automatic valve device 11, comprising a piston 13 contained in piston chamber 12, connected by pipe 14 to brake pipe 3 and a slide valve 15 contained in valve chamber 16 and adapted to be operated by piston 13.

In the automatic valve device 11 there is also provided a double seating check valve 18, adapted in one seated position, to establish communication from a passage 19, leading to the seat of slide valve 15, to the brake cylinder pipe 9ª and in its opposite seated position to open communication from a branch pipe 20 to pipe 9ª.

The branch pipe 20 opens into a pipe 21 which is connected through a flexible connection with the pipe 21 of a second locomotive.

A pipe 22, also open to pipe 21, and containing a cut-out cock 23, communicates with a passage 24, leading to the seat of slide valve 15.

The slide valve 15 is provided with a cavity 25 adapted in the normal release position of the valve to connect passage 19 with a passage 26, opening to the atmosphere.

In operation, the cock 23, on the engine from which the brakes are to be controlled, is opened and the cock 23 on the other engine is closed. The piston 13 is normally maintained at its inner position by brake pipe pressure admitted through pipe 14.

If it is desired to effect an application of the brakes, the engineer's brake valve is operated in the usual manner to effect a reduction in brake pipe pressure, by which the valve device 8 is operated to supply fluid to application chamber 5 and through passage 27 to piston 4.

The application valve 6 is thus operated by piston 4 to supply fluid to the pipe 9.

Fluid then flows through pipe 9 to valve chamber 16 and thence through passage 24, the slide valve 15 being in release position, to pipe 22 and pipe 21. From pipe 21, fluid can flow to the brake cylinder 10 on each locomotive through pipe 20 and past the double check valve 18 to pipe 9ª, the check valve being shifted to open position by flow of fluid through pipe 20, the opposite side of the check valve being open to the atmosphere through passage 19, cavity 25 and passage 26.

During the usual operations of applying and releasing the brakes, the piston 13 will be maintained at its inner position by brake pipe pressure, but when a break-in-two occurs, or the flexible hose between the locomotives bursts, then the valve device 8 of the distributing valve will be shifted to emergency position on each locomotive, so that full braking pressure is supplied to the valve chamber 16. The excessively low brake pipe pressure then acting on the opposite side of the piston 13, causes the higher pressure in chamber 16 to shift the piston 13, so as to close communication from valve chamber 16 to passage 24 and open passage 19 to valve chamber 16.

Fluid under pressure is then supplied to check valve 18 and this operates to shift same to its position for closing communication from passage 19 to the brake cylinder pipe 19ª.

If the automatic valve device on the head engine should happen to move to emergency position before the valve device on the second engine moves to that position under an over-reduction in brake pipe pressure or an ordinary emergency reduction as initiated at the brake valve, then according to my invention, the arrangement of the cavity 25 is such that the passage 24 is not connected to the exhaust passage 26 but is blanked, so that when the piston 13 on the second engine finally moves out fluid supplied to the brake cylinder on the second engine will not escape.

Having now described my invention, what I claim as new and desire to secure by Letters Patent, is:

1. In a fluid pressure brake, the combination with a brake pipe, of a train pipe line for supplying fluid from one locomotive to apply the brakes on another, an automatic valve device comprising a piston subject to brake pipe pressure and a valve operated by said piston and adapted in release position to establish communication through a passage for supplying fluid to said train pipe line and having an emergency position in which said passage is blanked.

2. In a fluid pressure brake, the combination with a brake pipe, of a train pipe line for supplying fluid from one locomotive to apply the brakes on another, an automatic valve device comprising a piston subject to brake pipe pressure and a valve operated by said piston and adapted in normal release position to uncover a passage for supplying fluid to said train pipe line and having an emergency position in which said passage is blanked.

In testimony whereof I have hereunto set my hand.

FREDERIC H. PARKE.

Witnesses:
A. M. CLEMENTS,
S. W. KEEFER.

Copies of this patent may be obtained for five cents each, by addressing the "Commissioner of Patents, Washington, D. C."